United States Patent
Fukuda et al.

(10) Patent No.: US 8,698,043 B2
(45) Date of Patent: Apr. 15, 2014

(54) HANDLE GRIP WITH HEATER

(75) Inventors: Yuichi Fukuda, Tokyo (JP); Michiyasu Watanabe, Tokyo (JP); Kouzo Sasaki, Tokyo (JP); Satoru Fujiwara, Tokyo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 1709 days.

(21) Appl. No.: 11/662,031

(22) PCT Filed: Sep. 5, 2005

(86) PCT No.: PCT/JP2005/016249
§ 371 (c)(1),
(2), (4) Date: Aug. 31, 2007

(87) PCT Pub. No.: WO2006/028050
PCT Pub. Date: Mar. 16, 2006

(65) Prior Publication Data
US 2008/0116188 A1    May 22, 2008

(30) Foreign Application Priority Data

Sep. 7, 2004 (JP) ................................. 2004-259158
Dec. 15, 2004 (JP) ................................. 2004-363413

(51) Int. Cl.
*B60L 1/02* (2006.01)
(52) U.S. Cl.
USPC ........................................ 219/202; 219/204

(58) Field of Classification Search
USPC .................................................. 219/204, 202
See application file for complete search history.

(56) References Cited

U.S. PATENT DOCUMENTS

| | | | | |
|---|---|---|---|---|
| 1,668,606 A | * | 5/1928 | Roberts | 439/453 |
| 1,780,851 A | * | 11/1930 | Strongson | 439/600 |
| 4,990,753 A | | 2/1991 | Hollander | |
| 5,834,734 A | * | 11/1998 | Ogata | 219/204 |
| 2006/0163232 A1 | * | 7/2006 | Hollander | 219/202 |

FOREIGN PATENT DOCUMENTS

| | | |
|---|---|---|
| JP | 53-537 | 1/1978 |
| JP | 58-157883 U | 10/1983 |
| JP | 62-30986 U | 2/1987 |
| JP | 1-81192 U | 5/1989 |
| JP | 9-156562 A | 6/1997 |
| JP | 10-067366 A | 3/1998 |
| JP | 2002-96785 A | 4/2002 |
| JP | 2002-225768 A | 8/2002 |

\* cited by examiner

*Primary Examiner* — Henry Yuen
*Assistant Examiner* — Eric Stapleton
(74) *Attorney, Agent, or Firm* — Holtz, Holtz, Goodman & Chick

(57) ABSTRACT

A grip member with an electric heater, in which the surface of a core body when a heater is installed is flat. A metal conductive plate, such as a SUS plate with a thickness of about 30 μm formed in a belt-like shape, is spirally embedded along a flat groove section provided in a core body, the surface of the core body is made flat, and the metal conductive plate is fixed at both ends to the core body. An electric current is passed through the metal conductive plate to cause it to generate heat.

15 Claims, 3 Drawing Sheets

HANDLE GRIP WITH HEATER

This application is a U.S. National Phase Application under 35 USC 371 of International Application PCT/JP2005/016249 filed Sep. 5, 2005.

FIELD OF THE INVENTION

The present invention relates to a handle grip with heater for use in motorcycles and snowmobiles.

BACKGROUND OF THE INVENTION

In handle grips of motorcycles and snowmobiles used in cold districts, electric heating wires are installed within handle grips made of synthetic rubber for warming hands of users as described in, for instance the following Patent Document. In this known handle grip, an electric heating wire is wound helically around a core body made of a synthetic resin such that the electric heating wire is installed within a groove formed on the surface of the core body. Then, an assembly of the core body and heating wire is covered with a synthetic rubber by molding.

The Patent document 1: U.S. Pat. No. 4,990,753

DISCLOSURE OF THE INVENTION

In the known handle grip disclosed in the Patent Document 1, since the electric heating wire is wound within the groove, a surface of the assembly of the core body and heating wire is not flat, but has configuration with depressions and protrusions. In order to prevent such a configuration with depressions and protrusions from being transferred to a hand of a user, it is necessary to mold the synthetic rubber having a large thickness. Then, it is apparent that heat generated by the electric heating wire could not be transferred to the user's hand effectively.

The present invention has for its object to provide a handle grip with heater which can resolve the above mentioned problem and can have a high heat transfer efficiency by making the surface of the assembly of the core body and electric heating wire flat.

Means for Solving the Problems

According to the invention, in order to achieve the above mentioned object, a handle grip with heater comprises a cylindrical core body made of a synthetic resin, said core body having a flat and shallow groove formed spirally in a surface of the core body, and a metal strip having a width substantially identical with a width of said flat and shallow groove and being embedded within said flat and shallow groove, said metal strip generating heat by supplying an electric current through the metal strip.

In the handle grip with heater according to the invention, since the heat generating metal strip is arranged within the flat and shallow groove formed spirally, a surface of an assembly of the core body and metal strip can be formed to be flat. Therefore, a synthetic resin can be easily formed around the assembly of the core body by molding and heat generated by the metal strip can be effectively transferred to a hand of a user.

Figure 1:
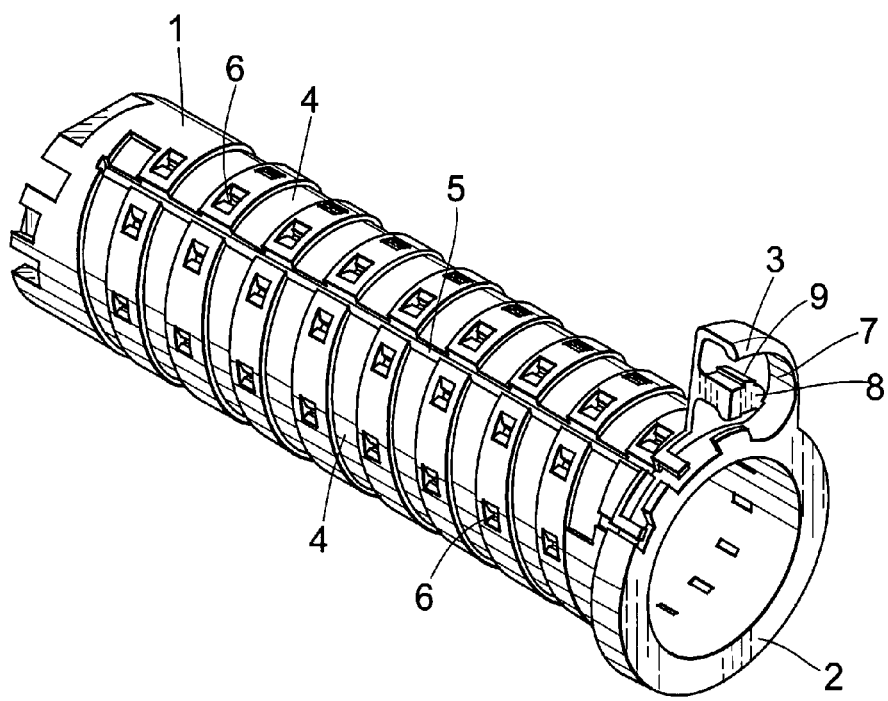
FIG. 1 is a perspective view showing a core body of the handle grip with heater according to the invention.

EXPLANATION OF THE REFERENCE NUMERALS 1 core body
2 ring-shaped portion
3 guide portion for electric power supply wire
4 flat and shallow groove
5 guide recess for electric power supply conductor
6 hole
7 guide recess for electric power supply wire
11 metal strip
13 electric power supply wire
14 synthetic rubber

BEST MODES OF THE INVENTION

Now the present invention will be explained in detail with reference to the embodiments shown in the drawings.

FIG. 1 is a perspective view showing an embodiment of the handle grip with heater according to the invention. A core body 1 constituting a major portion of the handle grip is formed by a cylindrical member made of a synthetic resin, and includes a ring-shaped portion 2 formed at a root of the core body 1. The ring-shaped portion 2 has formed therein a guide portion 3 for supporting an electric power supply wire to be explained later. A flat and shallow groove 4 is formed spirally in a surface of the core body 1. It should be noted that the core body 1 may be formed by cementing two semi-cylindrical members.

In the surface of the core body 1 there is further formed a longitudinal guide recess 5 for guiding one of power supply conductors of the power supply wire for supplying an electric current to a metal strip to be explained later. A depth of the longitudinal guide recess 5 is larger than a depth of the flat and shallow groove 4. A number of through holes 6 are formed in a surface area of the core body 1 except for the flat and shallow groove 4.

The guide portion 3 includes an electric power supply wire guide recess 7 which is formed in a U-shaped manner around a wire direction converting portion 8. On an outer surface of the wire direction converting portion 8, there are formed ridges 9 extending in a longitudinal direction of the core body 1 for preventing undesired slippage of the electric power supply wire.

Figure 2:
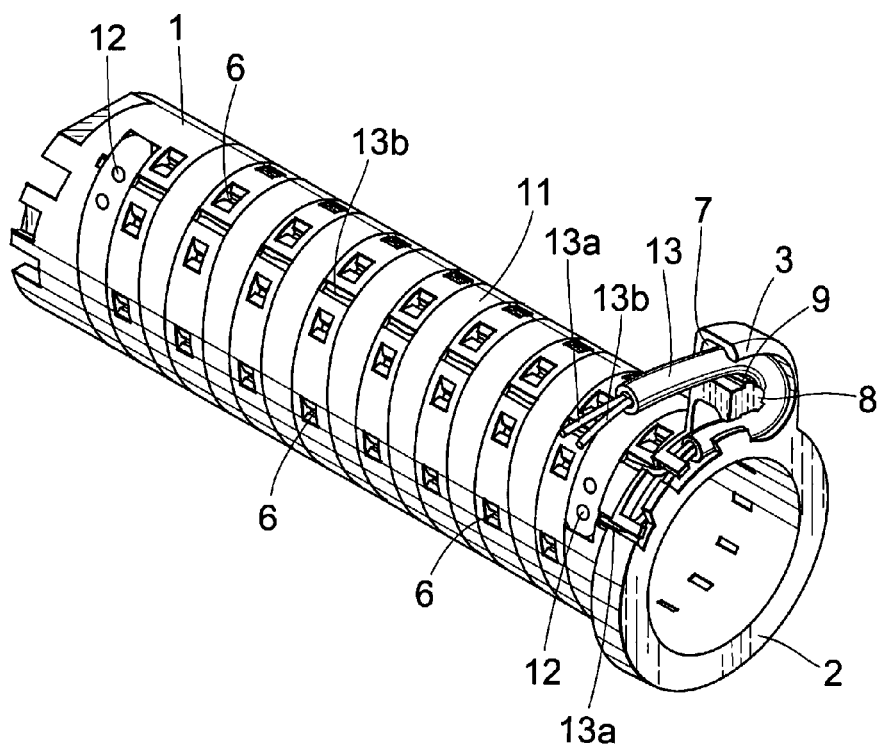
FIG. 2 is a perspective view illustrating a condition in which a metal strip is wound spirally around the core body.

FIG. 2 is a perspective view showing a condition in which a band-shaped metal strip 11 is embedded in the flat and shallow groove 4. The metal strip 11 may be formed by punching a SUS (stainless steel) plate having a thickness of, for instance 30 μm into a narrow band shape. The metal strip 11 is inserted into the flat and shallow groove 4 such that the metal strip 11 is wound around the core body 1 spirally. Both ends of the metal strip 11 are secured to the core body 1. That is to say, pins 12 projecting from the core body 1 are inserted into openings formed in end portions of the metal strip 11, and then top potions of the pins 12 are melted and deformed by heat.

Within the electric power supply wire guide recess 7 of the guide portion 3, there is provided the electric power supply wire 13 including two mandrels or conductors 13a and 13b, and one of the conductors 13a is secured by soldering to one end portion of the metal strip 11 near the ring-shaped portion 2. The other conductor 13b is inserted into the conductor guide recess 5 before the metal strip 11 is inserted into the flat and shallow groove 4. After inserting the metal strip 11 into the groove 4, an end of the conductor 13b is secured by soldering to the other end portion of the metal strip 11.

The electric power supply wire 13 is inserted into the electric power supply wire guide recess 7 and is turned over by 180° around the direction converting portion 8. Even if the electric power supply wire 13 were pulled outwardly, the electric power supply wire 13 could not be drawn from the handle grip due to the function of the ridges 9.

Figure 3:
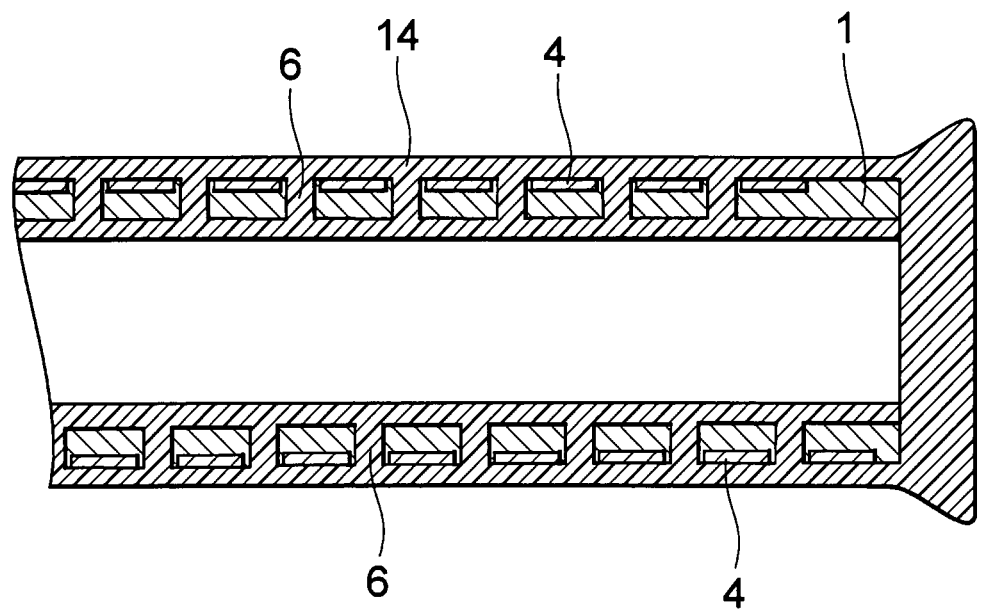
FIG. 3 is a longitudinal cross sectional view depicting a condition in which a synthetic resin is formed around the core body by molding.

FIG. 3 is a longitudinal cross section showing a condition in which an assembly of the core body 1 and metal strip 11 is covered with a synthetic rubber 14 by injection mold. During the molding of the synthetic rubber 14, the synthetic rubber material can be effectively intruded into both the outer and inner surfaces of the assembly through the holes 6 and show an electrical insulating property. An outer surface of the synthetic rubber 14 constitutes a final surface of the handle grip and a handle pipe is inserted into an inner surface the synthetic rubber 14.

The handle grip manufactured in the manner explained above may be secured to a handle pipe of a motorcycle. When an electric current flows to the metal strip 11 via the electric power supply wire 13, heat is generated from the metal strip 11. According to the invention, the synthetic rubber 14 can be formed to have a smaller thickness, and therefore the heat generated by the metal strip 11 can be effectively transferred to a palm of a hand of a user through the thin synthetic rubber 14.

Figure 4:
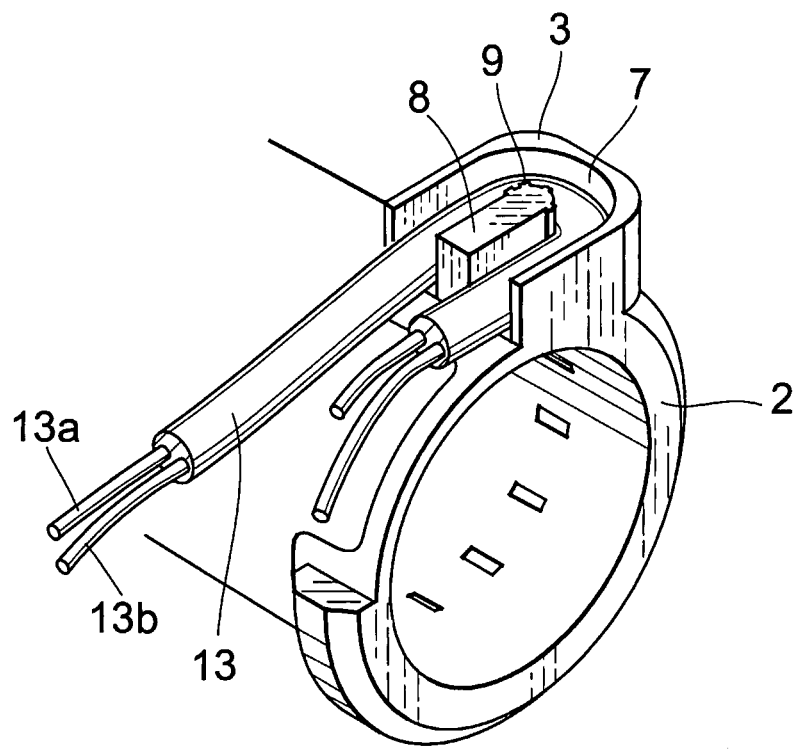
FIG. 4 is a perspective view showing another embodiment of a ring-shaped portion according to the invention.

FIG. 4 is a perspective view showing another embodiment of the ring-shaped portion 2. A guide portion 3 includes an electric power supply wire guide recess 7 which is faced upwardly, and an electric power supply wire 13 is turned over by 180° in a plane which is substantially parallel with a metal strip 11. That is to say, the electric power supply wire 13 is turned over into a same direction into which the electric power supply wire is drawn from the external.

Figure 5:
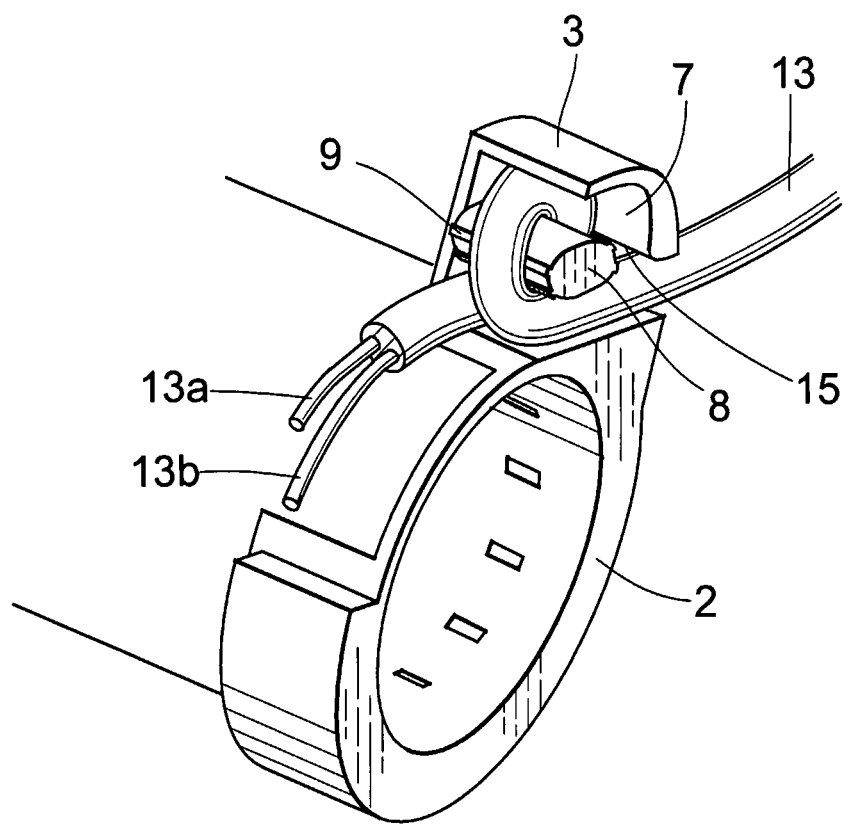
FIG. 5 is a perspective view illustrating still another embodiment of the ring-shaped portion according to the invention.

FIG. 5 is a perspective view showing another modification of the ring-shaped portion 2. In this modified embodiment, an electric power supply wire guide recess 7 of a guide portion 3 is formed to have a larger depth and an outlet opening 15 is formed at a position opposite to an inlet opening.

The electric power supply wire 13 inserted into the guide portion 3 is turned over by one turn around a direction converting portion 8 and is extended from the outlet opening 15 into a direction opposite to a direction into which the electric power supply wire 13 is led into the guide portion 3.

What is claimed is:

1. A handle grip comprising:
   a cylindrical core body made of a synthetic resin;
   a metal strip which generates heat when an electric current is supplied through the metal strip;
   a ring-shaped portion provided at one longitudinal end of the core body;
   a guide portion for guiding an electric power supply wire including a pair of electric power supply conductors, the guide portion being provided at the one longitudinal end of the core body; and
   a wire direction converting portion which projects in a longitudinal direction of the core body;
   wherein ridges are formed on an outer surface of the wire direction converting portion to prevent slipping of the electric power supply wire;
   wherein a U-shaped electric power supply wire guide recess is formed in the guide portion around the wire direction converting portion;
   wherein the pair of electric power supply conductors are connected to both ends of the metal strip, respectively; and
   wherein the electric power supply wire is introduced into the U-shaped electric power supply wire guide recess along the ring-shaped portion, and is turned 180° around the wire direction converting portion so as to exit from the U-shaped electric power supply wire guide recess to a same side of the electric power supply wire guide recess from which the electric power supply wire is introduced into the electric power supply wire guide recess.

2. The handle grip according to claim 1, wherein the core body has a flat and shallow groove formed in an outer surface of the core body, and the metal strip is embedded in the flat and shallow groove.

3. The handle grip according to claim 2, wherein the core body has an electric power supply conductor guide recess formed in the outer surface of the core body along the longitudinal direction of the core body;
   wherein the electric power supply conductor guide recess has a depth that is larger than a depth of the flat and shallow groove; and
   wherein one of the pair of electric power supply conductors is embedded within the electric power supply conductor recess, and an end portion of the one of the pair of electric power supply conductors is connected to one of the ends of the metal strip that is farther from the guide portion.

4. The handle grip according to claim 2, wherein the core body has a plurality of molding holes positioned in areas of the core body where the flat and shallow groove is not provided.

5. The handle grip according to claim 4, further comprising an insulating synthetic rubber which is formed by molding such that the metal strip, the electric power supply wire, and outer and inner surfaces of the core body are covered with the synthetic rubber, which penetrates through the molding holes.

6. A handle grip comprising:
   a cylindrical core body made of a synthetic resin;
   a metal strip which generates heat when an electric current is supplied through the metal strip;
   a ring-shaped portion provided at one longitudinal end of the core body;
   a guide portion for guiding an electric power supply wire including a pair of electric power supply conductors, the guide portion being provided at the one longitudinal end of the core body; and
   a wire direction converting portion which projects in an axial direction of the core body, which is perpendicular to a longitudinal direction of the core body;
   wherein ridges are formed on an outer surface of the wire direction converting portion to prevent slipping of the electric power supply wire;
   wherein a U-shaped electric power supply wire guide recess is formed in the guide portion around the wire direction converting portion, wherein the U-shaped electric power supply wire guide recess is open outwardly from the core body in the axial direction of the core body;

wherein the pair of electric power supply conductors are connected to both ends of the metal strip, respectively; and wherein the electric power supply wire is introduced into the U-shaped electric power supply wire guide recess along the ring-shaped portion, and is turned 180° around the wire direction converting portion in a plane that is parallel to the metal strip so as to exit from the U-shaped electric power supply wire guide recess to a same side of the electric power supply wire guide recess from which the electric power supply wire is introduced into the electric power supply wire guide recess.

7. The handle grip according to claim 6, wherein the core body has a flat and shallow groove formed in an outer surface of the core body, and the metal strip is embedded in the flat and shallow groove.

8. The handle grip according to claim 7, wherein the core body has an electric power supply conductor guide recess formed in the outer surface of the core body along the longitudinal direction of the core body;

wherein the electric power supply conductor guide recess has a depth that is larger than a depth of the flat and shallow groove; and wherein one of the pair of electric power supply conductors is embedded within the electric power supply conductor recess, and an end portion of the one of the pair of electric power supply conductors is connected to one of the ends of the metal strip that is farther from the guide portion.

9. The handle grip according to claim 7, wherein the core body has a plurality of molding holes positioned in areas of the core body where the flat and shallow groove is not provided.

10. The handle grip according to claim 9, further comprising an insulating synthetic rubber which is formed by molding such that the metal strip, the electric power supply wire, and outer and inner surfaces of the core body are covered with the synthetic rubber, which penetrates through the molding holes.

11. A handle grip comprising:
a cylindrical core body made of a synthetic resin;
a metal strip which generates heat when an electric current is supplied through the metal strip;
a ring-shaped portion provided at one longitudinal end of the core body;
a guide portion for guiding an electric power supply wire including a pair of electric power supply conductors, the guide portion being provided at the one longitudinal end of the core body; and
a wire direction converting portion which projects in a longitudinal direction of the core body;

wherein ridges are formed on an outer surface of the wire direction converting portion to prevent slipping of the electric power supply wire;

wherein an electric power supply wire guide recess is formed in the guide portion around the wire direction converting portion;

wherein the power supply wire guide recess has an inlet opening for the electric power supply wire, and an outlet opening for the electric power supply wire that is positioned opposite to the inlet opening;

wherein the pair of electric power supply conductors are connected to both ends of the metal strip, respectively; and wherein the electric power supply wire is introduced into the electric power supply wire guide recess along the ring-shaped portion via the inlet opening, and is turned 360° around the wire direction converting portion so as to exit from the electric power supply wire guide recess via the outlet opening to a side of the electric power supply wire guide recess that is opposite from a side of the electric power supply wire guide recess from which the electric power supply wire is introduced into the electric power supply wire guide recess.

12. The handle grip according to claim 11, wherein the core body has a flat and shallow groove formed in an outer surface of the core body, and the metal strip is embedded in the flat and shallow groove.

13. The handle grip according to claim 12, wherein the core body has an electric power supply conductor guide recess formed in the outer surface of the core body along the longitudinal direction of the core body;

wherein the electric power supply conductor guide recess has a depth that is larger than a depth of the flat and shallow groove; and wherein one of the pair of electric power supply conductors is embedded within the electric power supply conductor recess, and an end portion of the one of the pair of electric power supply conductors is connected to one of the ends of the metal strip that is farther from the guide portion.

14. The handle grip according to claim 12, wherein the core body has a plurality of molding holes positioned in areas of the core body where the flat and shallow groove is not provided.

15. The handle grip according to claim 14, further comprising an insulating synthetic rubber which is formed by molding such that the metal strip, the electric power supply wire, and outer and inner surfaces of the core body are covered with the synthetic rubber, which penetrates through the molding holes.

* * * * *